(12) United States Patent
Miller

(10) Patent No.: US 7,761,475 B2
(45) Date of Patent: Jul. 20, 2010

(54) METHOD, SYSTEM AND COMPUTER-READABLE MEDIA FOR MANAGING DYNAMIC OBJECT ASSOCIATIONS AS A VARIABLE-LENGTH ARRAY OF OBJECT REFERENCES OF HETEROGENEOUS TYPES BINDING

(75) Inventor: Scott Warren Miller, San Mateo, CA (US)

(73) Assignee: Objectivity, Inc., Sunnyvale, CA (US)

( * ) Notice: Subject to any disclaimer, the term of this patent is extended or adjusted under 35 U.S.C. 154(b) by 254 days.

(21) Appl. No.: 11/879,022

(22) Filed: Jul. 13, 2007

(65) Prior Publication Data

US 2009/0019080 A1 Jan. 15, 2009

(51) Int. Cl.
*G06F 17/30* (2006.01)
(52) U.S. Cl. ........................................ 707/802; 707/955
(58) Field of Classification Search .................. 707/100, 707/101, 802, 955, 999.103
See application file for complete search history.

(56) References Cited

U.S. PATENT DOCUMENTS

| 5,854,750 | A | 12/1998 | Phillips et al. |
| 5,995,973 | A * | 11/1999 | Daudenarde ........................ 1/1 |
| 6,101,502 | A | 8/2000 | Heubner et al. |
| 6,456,995 | B1 | 9/2002 | Salo et al. |
| 6,877,159 | B1 | 4/2005 | Nielsen et al. |
| 6,947,952 | B1 * | 9/2005 | Welch et al. ............. 707/104.1 |
| 7,000,017 | B1 | 2/2006 | McGill et al. |
| 7,149,751 | B1 | 12/2006 | McGill et al. |
| 7,290,113 | B2 * | 10/2007 | Weinreb et al. ............. 711/203 |
| 2002/0107872 | A1 | 8/2002 | Hudis et al. |
| 2006/0200662 | A1 | 9/2006 | Fulton et al. |
| 2006/0236380 | A1 | 10/2006 | Bransom et al. |
| 2006/0277202 | A1 | 12/2006 | Dempsey |
| 2008/0147724 | A1 * | 6/2008 | Suvernev et al. ......... 707/103 Y |

* cited by examiner

*Primary Examiner*—Cheryl Lewis
(74) *Attorney, Agent, or Firm*—Patrick T. Reilly

(57) ABSTRACT

Apparatus, system, method and computer-readable media for organizing a listing of key pairs to increase the likelihood that key pairs more likely to satisfy database queries will be examined in the course of the query execution before key pairs that are less likely to satisfy a database query.

20 Claims, 10 Drawing Sheets

METHOD, SYSTEM AND COMPUTER-READABLE MEDIA FOR MANAGING DYNAMIC OBJECT ASSOCIATIONS AS A VARIABLE-LENGTH ARRAY OF OBJECT REFERENCES OF HETEROGENEOUS TYPES BINDING

FIELD OF THE INVENTION

The present invention relates generally to information technology systems that manage databases. More particularly, the present invention relates to object-oriented database management systems.

BACKGROUND OF THE INVENTION

Many prior art database management systems associate software objects by specifically defined relationship types.

The prior art includes U.S. Pat. No. 7,149,751 that discloses a system and method for distributing selected objects from a source database to a destination database; U.S. Pat. No. 7,000,017 that presents a system and method for distributing a selected object and for automatically distributing the objects that are associated with the selected object; U.S. Pat. No. 6,877,159 that teaches an apparatus and method for maintaining object associations in an object oriented environment; U.S. Pat. No. 6,456,995; that discusses a system, method, and computer program products for ordering objects; U.S. Pat. No. 6,101,502 that discloses an object model mapping and runtime engine for employing relational database with object oriented software; U.S. Pat. No. 5,854,750 that presents a system and method for processing transactions in an environment containing a number of object oriented applications; United States Patent Application Publication No. 20060236380 that teaches of a system and method for grouping device or application objects in a directory service; United States Patent Application Publication No. 20060200662 that discusses referencing objects in a virtual environment; United States Patent Application Publication No. 20060277202 that discloses a system and method for performing object association using a location tracking system; and United States Patent Application Publication No. 20020107872 that presents an object manager for a common information model.

Each and every patent and patent application publication document referenced herein is incorporated by reference within this disclosure in their entirety and for all purposes, to include U.S. Pat. Nos. 7,149,751; 7,000,017; 6,877,159; 6,456,995 6,101,502; 5,854,750 and United States Patent Application Publication No.'s 20060236380; 20060200662; 20060277202; and 20020107872.

In the prior art, an object-oriented database might include an employee record software object for each employee of a company. The employee record objects might all be of a same type number and each individual object might be intended to include personal information and employment data related to a specific employee. Relationships such as "supervisor" and "subordinate" may be defined by the database management system and used to relate software objects within the database.

Certain prior art database management systems build a listing of software objects related to a particular software object (hereafter "parent object"). and associate the listing with that parent object. The listing may be maintained within the schema of the parent object or outside of the parent object structure.

A listing may be maintained within an ordered list or vector such as a variable length array, wherein the variable length array includes a plurality of key pairs. Each key pair may include (1.) an object identification serial number (hereafter "OID") of a software object, and (2.) a data specifying the type of relationship that exists between the software object identified by the OID stored in the pair and the parent object.

Prior art search techniques access the listing in the execution of searches. The listing may be read by the database management system (hereafter "DBMS") in an order from first key pair to last key pair. The order of the key pairs within the listing therefore determines how much time passes and computational resource is expended before a key pair that satisfies a given query is located. Yet the ordering of the key pairs within the listing may be inconsistently related to the likelihood of a key pair satisfying a query within an operational environment. For example, the first key pair in a listing may include the OID of an education record software object that includes educational data concerning the employee of the parent object, and a datum that identifies the relationship defined between the parent object and the education record software object by the DBMS as being an EDUCATION relationship. Yet, this educational information key pair may be examined by every DBMS query execution that accesses the key pair listing of the parent object, while satisfying less than one in a million executed queries that examine the instant listing.

There is therefore a long felt need to store information identifying both (1.) OID's of objects having relationships with a particular software object, e.g., the parent object, and (2.) the types of relationships existing between each noted OID the same particular software object, by techniques and systems that improve the responsiveness and computational efficiency of a DBMS.

SUMMARY OF THE INVENTION

Towards this object and other objects that will be made obvious in light of this disclosure, a first version of the method of the present invention provides a technique that organizes a listing of key pairs such that those key pairs whose keys are more likely to satisfy DBMS queries will be examined in the course of the query execution before key pairs whose keys are less likely to satisfy a DBMS query.

According to this first version of the method of the present invention, or first method, a record of OID's and the relationships existing between each OID and a parent object is maintained in a key pair listing. Each key pair includes an OID and an identifier of the type of relationship that the DBMS recognizes as existing between the parent object and the software object identified by the OID of the key pair. The DBMS then monitors the interactivity of the parent object and a query engine of the DBMS, in particular noting when a key pair satisfies a query. It is understood that when a query is satisfied by the information stored in, or associated with, a key pair, the DBMS may cease a listing access process and thereby not waste time nor computational resources in fruitlessly examining those key pairs that are organized for access after the key pair that has satisfied the query.

The DBMS then routinely, periodically or occasionally reorganizes the order in which the key pairs are examined during a query execution in light of the history of each key pair in satisfying queries. The key pair reorganization within the listing may be initiated by a policy, after the passage of a time period, after a predetermined number of query executions, by an asynchronous condition or process, by administrator direction and/or by a pre-established sequence of events or conditions.

Certain alternate preferred embodiments of the present invention comprise an informational technology system that executes one or more embodiments of the method of the present invention.

Certain still alternate preferred embodiments of the present invention comprise a computer-readable media that includes machine-executable instructions that direct or enable an informational technology system to execute one or more embodiments of the method of the present invention.

The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
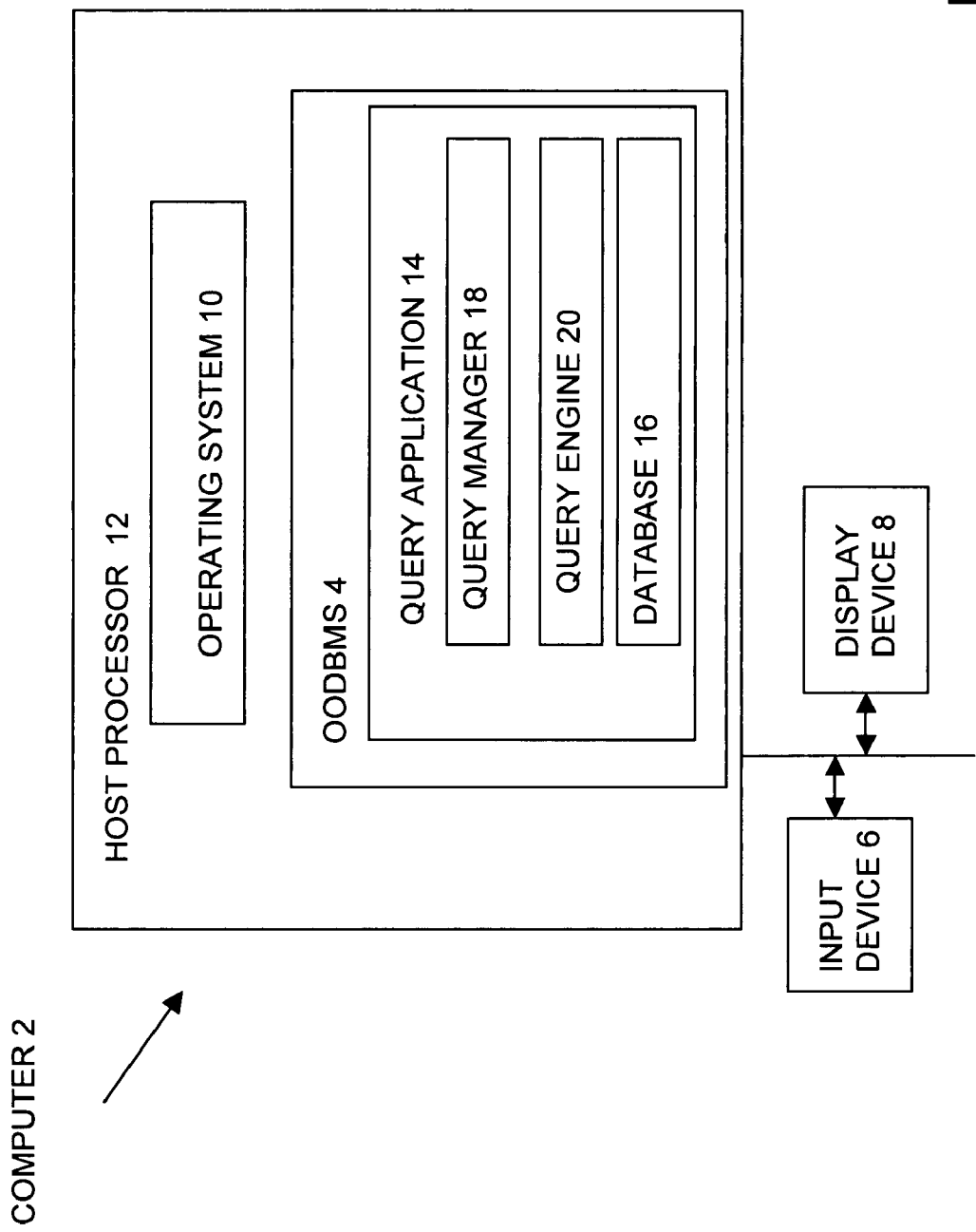
FIG. 1 is a schematic of a computer hosting an object-oriented database management system, or OODBMS.

Referring now generally to the Figures and particularly to FIG. 1, FIG. 1 is a schematic of a computer 2 hosting an object-oriented database management system 4 (hereafter "OODBMS" 4). The computer 2 includes an input device 6 such as an integrated mouse and keyboard peripheral, to enable a system administrator to program and input commands and information to the computer 2, and a display device 8, such as a video screen, to display information to the system administrator. An operating system 10 of the computer 2 directs a host processor 12 to store, manage and instantiate the OODBMS 4. The OODBMS 4 includes a query application program 14 that enables the host processor 12 of the computer 2 to query, search, and harvest information from a database 16 of the OODBMS 4. A query manager 18 of the OODBMS 4 applies a query engine 20 to search the database 10.

The computer 2 may be (1.) a SUN SPARCSERVER computer workstation marketed by Sun Microsystems of Santa Clara, Calif. running LINUX or UNIX operating system; (2.) a personal computer configured for running WINDOWS XP™ operating system marketed by Microsoft Corporation of Redmond, Wash.; or (3.) a PowerBook G4™ personal computer as marketed by Apple Computer of Cupertino, Calif. The OODBMS 4 may be or comprise (1.) an object oriented database as marketed by Objectivity, Inc., of Sunnyvale, Calif.; (2.) an IBM DB2 Universal Database™ server (in Linux, UNIX (R)) marketed by IBM Corporation of Armonk, N.Y.; and/or (3.) WINDOWS™ operating system environments marketed by Microsoft Corporation of Redmond, Wash.

Figure 2:
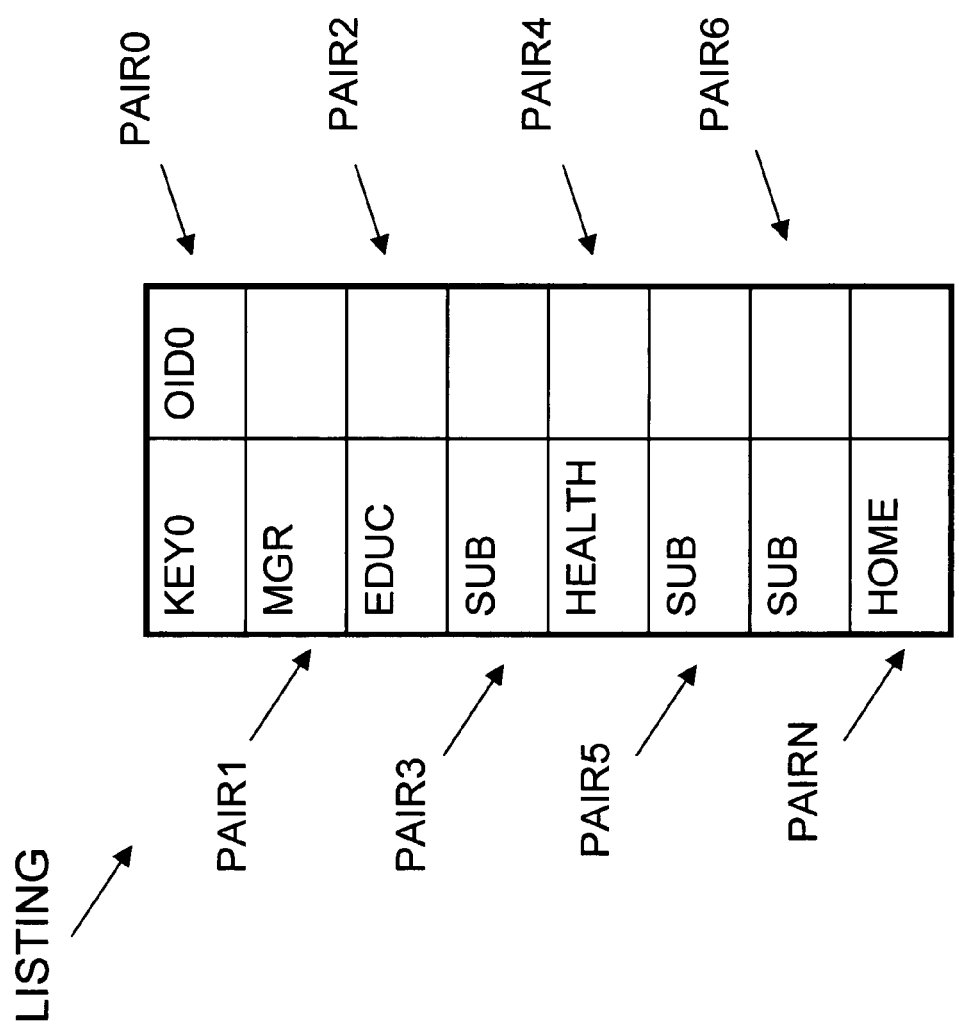
FIG. 2 is a schematic of a listing containing a plurality of key pairs, each key pair including both (1.) a relationship identifier as a key, and (2.) an OID.

Referring now generally to the Figures and particularly to FIG. 2, FIG. 2 is a schematic of a listing containing a plurality of key pairs, each key pair including both (1.) a relationship identifier as a key, and (2.) an OID. The listing may be stored in the database of the OODBMS 4 of FIG. 1. The key pairs are ordered from a Pair0 position to a PairN position. The listing is searched by the query engine in order from Pair0 to PairN. The key pairs may be reordered by the OODBMS 4 from one Pair position to another.

Each key pair includes a key and an OID. The key is an indicator of the type of associative relationship that the OODBMS 4 has assigned between the object of the OID of the same key pair and the parent object. It is understood that more than one key pair may have a same key, such as SUB.

The key SUB indicates that the OID of a key pair is associated with a person who is a direct report of the person associated with the parent object. The key MGR indicates that the OID of a key pair is associated with a person who is a manager of the person associated with the parent object. The key EDUC indicates that the OID of a key pair is associated with an educational record object of the person associated with the parent object. The key HEALTH indicates that the OID of a key pair is associated with a health information record object of the person associated with the parent object. The key HOME indicates that the OID of a key pair is associated with a residence information record object of the person associated with the parent object.

Figure 3:
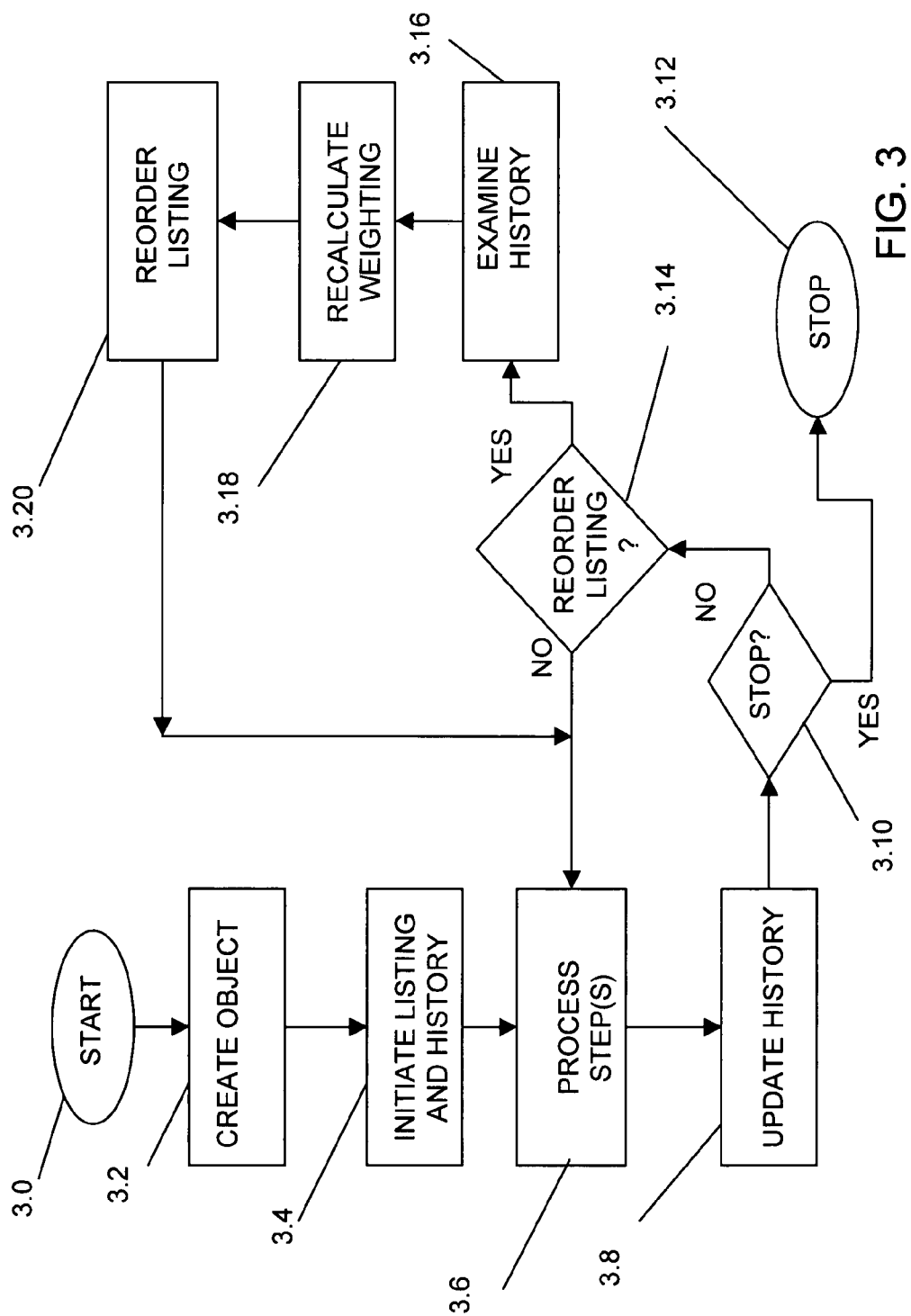
FIG. 3 is a flow chart of the first method, wherein the OODBMS of FIG. 2 accesses and reorganizes the listing of key pairs of FIG. 1.

Referring now generally to the Figures and particularly to FIG. 3, FIG. 3 is a flow chart of the first method, wherein the OODBMS 4 of FIG. 1 accesses and reorganizes the listing of key pairs of FIG. 2. In step 2.2 a parent object O1 is created and stored in the database of the OODBMS 4 of FIG. 1. In step 2.4 a listing and history record for the parent object is created and stored. The listing may be stored within the parent object itself or elsewhere in the. In step 2.6 one or more information processing steps are executed by the computer. The processing of step 2.6 may include the examination of the listing in the process of query executions. In step 2.8 the history record of the interaction between the query engine and the listing is updated. In step 2.10 the OODBMS 4 determines whether the process of FIG. 3 shall continue or be halted in step 2.12. In step 2.14 the OODBMS 4 determines whether the listing shall be reordered on the basis of the processing of step 2.6 and the history updating of step 2.8.

In step 2.16 the OODBMS 4 examines the history. In step 2.18 weightings of the information of the history are recalculated and in step 2.20 the key pairs are reordered within the listing on the basis of the weighting recalculation of steps 2.18.

Figure 4:
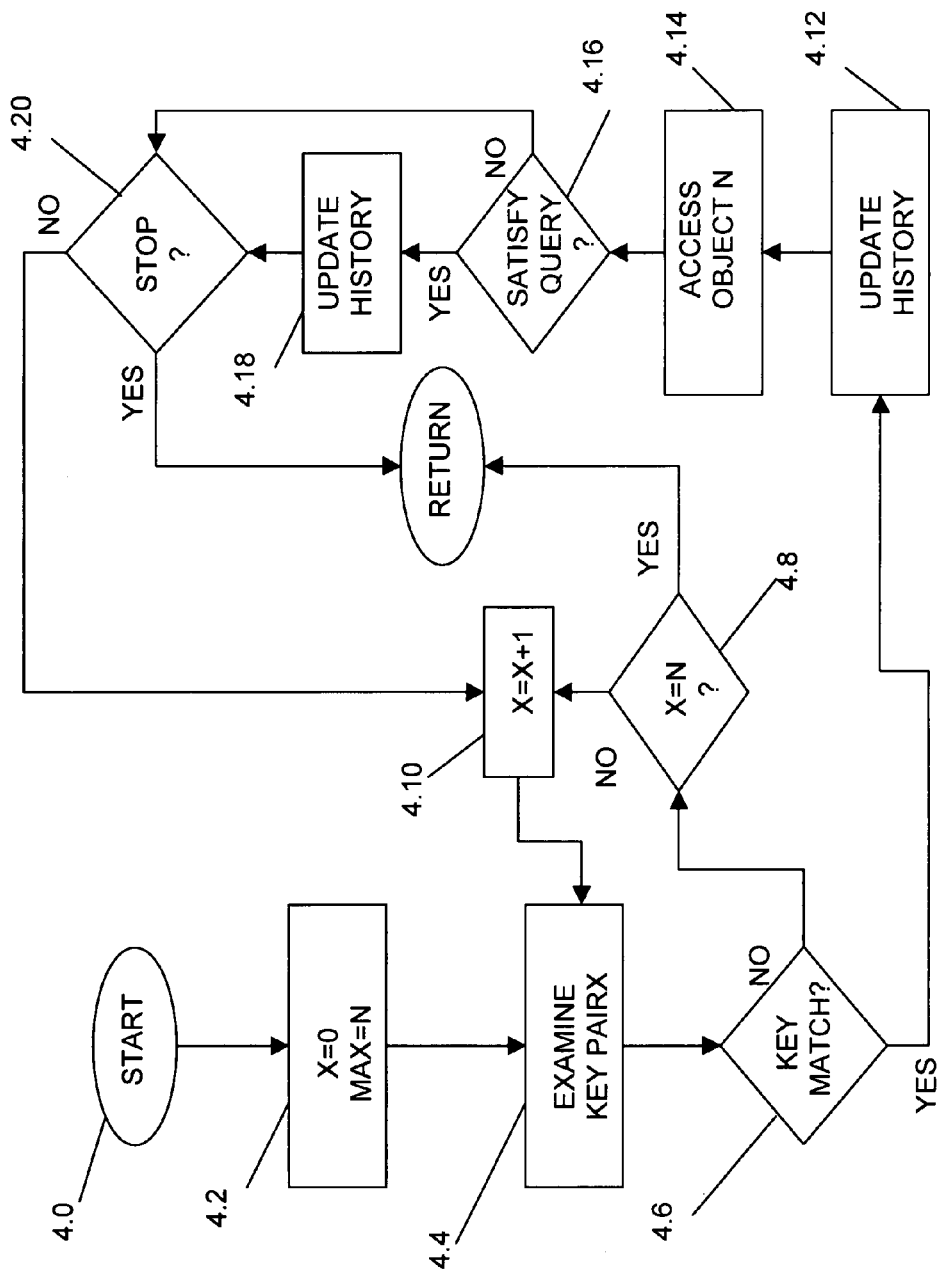
FIG. 4 is a flow chart of a second preferred embodiment of the method of the present invention, or second method, wherein the OODBMS of FIG. 2 accesses and reorganizes the listing of key pairs of FIG. 1.

Referring now generally to the Figures and particularly to FIG. 4, FIG. 4 is a flow chart of a second preferred embodiment of the method of the present invention, or second method, wherein the OODBMS 4 of FIG. 1 accesses and reorganizes the listing of key pairs of FIG. 2. In step 4.2 a variable X is set to a zero value and a MAX value is set to the highest PairN value of the listing. In step 4.4 a key pair in the PairX location is examined in the course of a current query execution by the OODBMS 4. When the key of the key pair examined in step 4.4 does not match the current query of step 4.4, the OODBMS 4 determines in step 4.8 whether the last examine key pair is in the last location of the listing. In step 4.10 the OODBMS 4 increments the X variable and returns to searching the listing in step 4.4.

When the key of the key pair examined in step 4.4 matches the current query of step 4.4, the OODBMS 4 proceeds from step 4.6 to step 4.12, wherein the match of the key of step 4.6 is noted in the history of the listing. In step 4.14 the OODBMS 4 accesses the object of the OID of the key pair examined in step 4.6, and in step 4.16 the OODBMS 4 determines whether the information contained in the object accessed in step 4.14 satisfies the query of step 4.4. The history of the listing is updated in step 4.18 to note that the object associated with the key pair of step 4.14 has satisfied an executed query. In step 4.20 the OODBMS 4 whether to continue processing search queries or to return to other operations.

Figure 5:
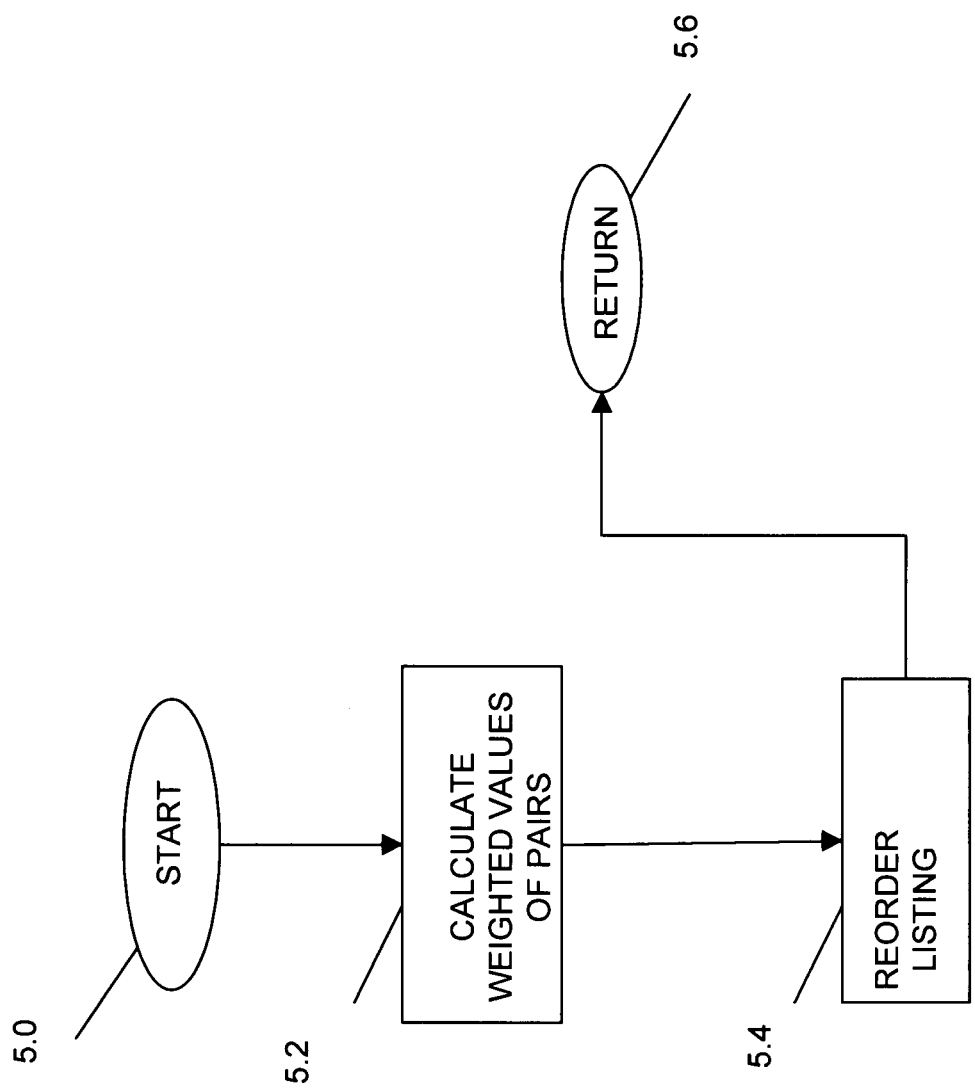
FIG. 5 is a flowchart of the recomputation and reordering of the key pairs of listing of FIG. 1.

Referring now generally to the Figures and particularly to FIG. 5, FIG. 5 is a flowchart of the recomputation and reordering of the key pairs of the listing of FIG. 1. In step 5.2 the weighted values of key pairs are recomputed in light of the query processing performed in step 4.4 and the parent object history updating performed in steps 4.12 and 4.18. In step the 5.4 the key pairs of the listing are reordered on the basis of the key pair weighting recomputation of step 5.2.

The recomputation of step 5.2 may be made in a variety of ways. In a first method, a key pair weighting is generated by dividing the number of instances when a key of the key pair matched a query in the execution of step 4.6 by the total number of queries executed. The time period for counting key match instances and queries executed may (1.) extend from the initiation of the parent object, or (2.) from some time period of length T, where the time period T ends approximately at the initiation of the recomputation of step 5.2.

Alternatively or additionally, the key pair weighting may be calculated using a combination of ratios of key match instances and executed queries of separate time periods. For example, a first key pair weighting factor may be generated by dividing the number of instances when a key of the key pair matched a query in the execution of step 4.6 by the total number of queries executed, wherein the observed key match instances and executed queries were observed in the time period extending from the initiation of the parent object and up to the beginning of the time period T. A second key pair weighting factor may be generated by dividing the number of instances when a key of the key pair matched a query in the execution of step 4.6 by the total number of queries executed, wherein the observed key match instances and executed queries were observed in the time period T. The first key pair factor and the second key pair factor may be separately multiplied by relative weight factors to give more or less mathematical significance to the computational activity observed prior to time period T or alternatively during time period T.

In step 5.4 the key pairs are ranked in order from highest weighted value to lowest weighted value, wherein the key pair having the highest weighted pair value as calculated in the most recently executed step 5.2 is ordered in the Pair0 location of the listing, and the key pair having the lowest weighted pair value as calculated in the most recently executed step 5.2 is ordered in the PairN location of the listing. Where weighted values of two key pairs are found to be equal in the execution of step 5.4, the OODBMS 4 may allow the relative ranking of the two key pairs having equal weighted values to remain in the previously calculated sequence, i.e., the earlier ranked key pair will remain located within the listing for earlier sequential access by the OODBMS 4.

Figure 6:
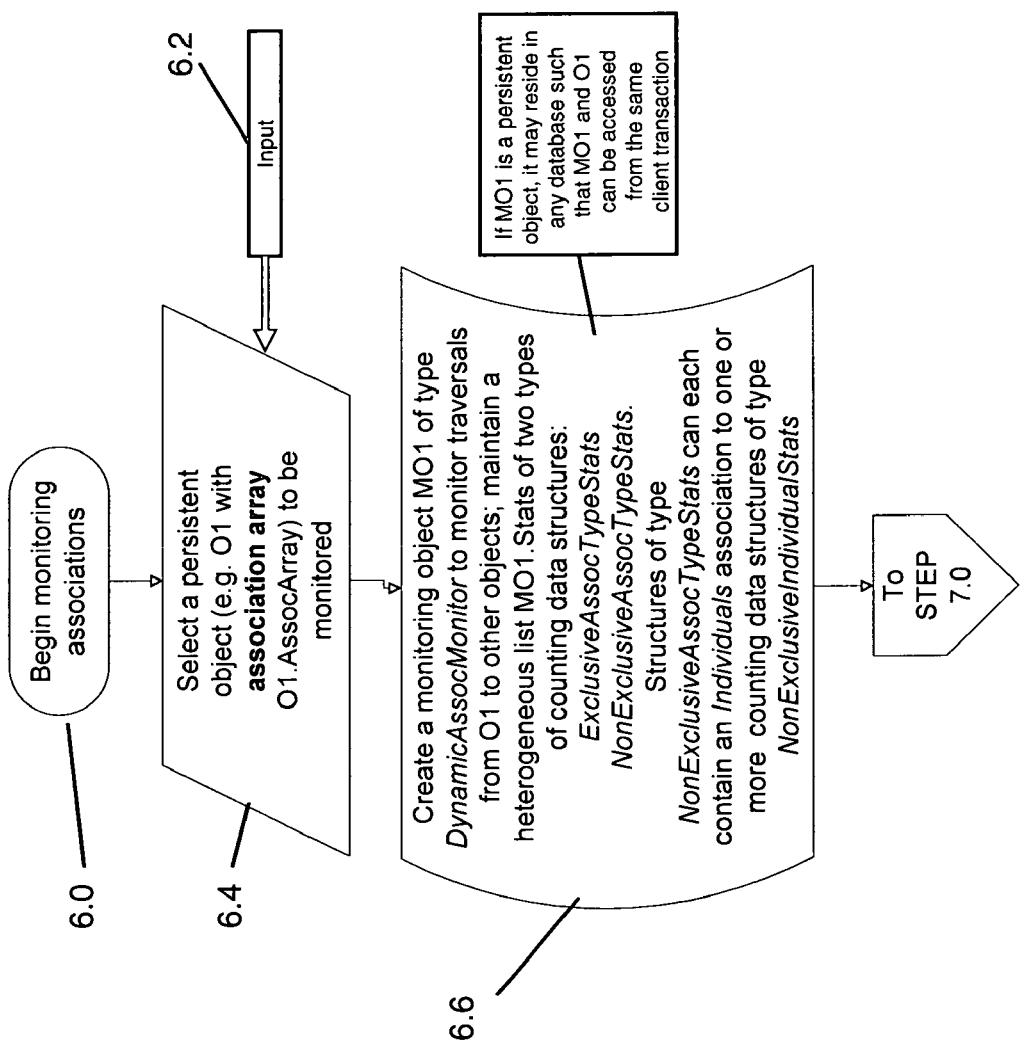
FIG. 6 is a flow chart of a third preferred embodiment of the method of the present invention, or third method, wherein the OODBMS of FIG. 2 accepts new data and monitors at least one persistent object.

Referring now generally to the Figures and particularly to FIG. 6, FIG. 6 is a flow chart of a third preferred embodiment of the method of the present invention (hereafter "third method") wherein the OODBMS 4 of FIG. 2 accepts new data and monitors at least one persistent object O1. In step 6.0 the OODBMS 4 begins monitoring associations among objects of the object database 16. In step 6.2 the computer 2 receives new information for inclusion in the object database 16 via the input device into at least one selected object O1, a communications network (not shown) such as the Internet, and/or an electronic media (not shown), e.g., an optical memory disc.

In step 6.4 the OODBMS 4 selects a persistent object O1 related to the information received in step 6.2 and initiates monitoring the selected object. In step 6.6 the OODBMS 4 creates a new persistent object M01 of type DynamicAssocMonitor, or "D object" M01. The new persistent D object M01 created in step 6.6 may be used as an instrument or record to monitor traversals from the selected object O1 of step 6.4 and other objects either of the OODBMS 4 or accessible to the OODBMS 4 by means of the electronic communications network or electronic storage media. The new persistent D object M01 may reside in the database 16, or any suitable database known in the art wherein the selected object O1 and the new persistent D object M01 may be accessed in a same client transaction with or within the computer 2. The OODBMS 4 proceeds from step 6.6 to step 7.0.

Figure 7:
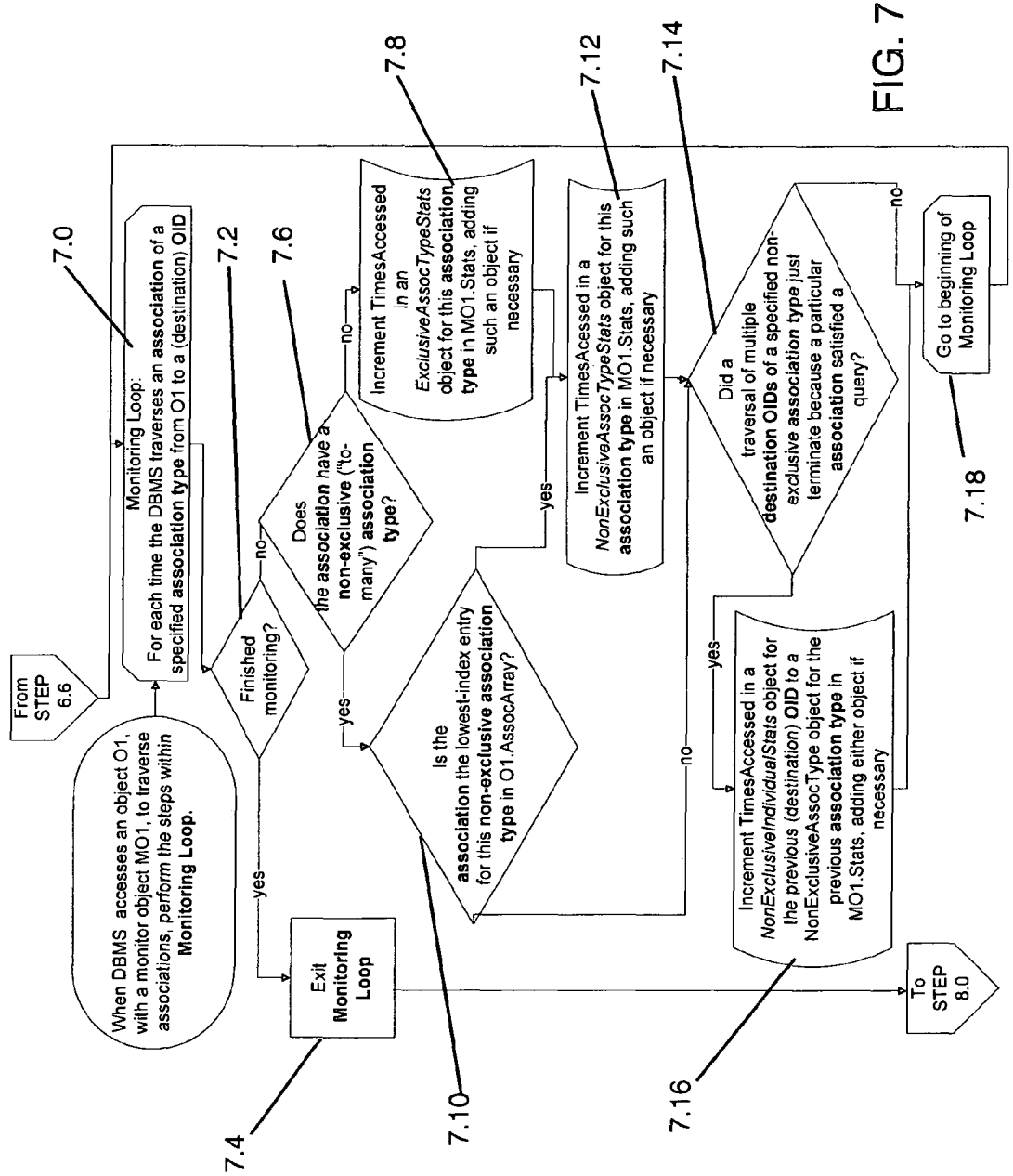
FIG. 7 is a flow chart of additional aspects of the third method of FIG. 6, wherein an object monitoring loop is initiated.

Referring now generally to the Figures and particularly to FIG. 7, FIG. 7 is a flow chart of additional aspects of the third method of FIG. 6, wherein an object monitoring loop of steps 7.0-7.18 is initiated. The monitoring of persistent objects O1-ON maintained in the computer 2 is initiated in step 7.0. When the OODBMS 4 opens any object M01-M0N with an associated object of type DynamicAssocMonitor, the OODBMS 4 initiates a performance of the monitoring steps within the monitoring loop of step 7.0 through 7.18.

The OODBMS 4 determines in step 7.2 whether the object monitoring loop of steps 7.0 through 7.18 and initiated in step 7.0 shall cease. Where the OODBMS 4 determines in step 7.2 that execution of the persistent object monitoring loop shall cease, the OODBMS 4 proceeds on to step 7.4 and ceases persistent object monitoring and then proceeds on from step 7.4 to step 8.0 of FIG. 8. Alternatively, where the OODBMS 4 determines in step 7.2 that execution of the persistent object monitoring loop shall continue, the OODBMS 4 proceeds on to step 7.6, wherein for each time the OODBMS 4 traverses an association from the object O1 to any object O2-ON using the key pair listing such as is illustrated in FIG. 2, the OODBMS 4 determines whether the instant key exhibits a non-exclusive, or "to many", association type. Where a "to many" association type is not found by the OODBMS 4 in step 7.6 to be applicable to the association, the OODBMS 4 proceeds from step 7.6 to execute step 7.8 and counts a traversal through the current association type key by incrementing the TimesAccessed value of an ExclusiveAssocTypeStats object which has been appended to a Stats list attribute of the D object M01. Alternatively, where a "to many" association type is found in step 7.6 by the OODBMS 4 to be applicable to the current entry, the OODBMS 4 proceeds from step 7.6 to execute step 7.10. The OODBMS 4 determines in step 7.10 whether the key pair of step 7.6 occupies the lowest index entry among those in the M01's key pair listing with the current association type. Where the OODBMS 4 determines in step 7.10 that the key pair of step 7.6 occupies the lowest index entry among those in the M01's key pair listing with the current association type, the OODBMS 4 proceeds from step 7.10 to execute step 7.12. The OODBMS 4 may also proceed from step 7.8 to step 7.12. In step 7.12 the OODBMS 4 counts a traversal through the current association type key by incrementing the TimesAccessed value of a NonExclusiveAssocTypeStats object which has been appended to a Stats list attribute of the D object M01. The OODBMS 4 then proceeds on from step 7.12 to execute step 7.14. Alternatively, where the OODBMS 4 determines in step 7.10 that key pair of step 7.6 does not occupy the lowest index entry among those in the M01's key pair listing with the current association type, the OODBMS 4 proceeds from step 7.10 to execute step 7.14.

In step 7.14 the OODBMS 4 determines whether the current association traversal constitutes an interruption of a previously ongoing pattern of traversal of associations of the same non-exclusive type, in which case the OODBMS 4 shall take such an interruption to indicate that the particular association that was traversed in the last iteration of step 7.0 satisfied a query such that further traversal of that association type would have been superfluous. When the OODBMS 4 determines in step 7.14 that the current association traversal constitutes an interruption of a previously ongoing pattern of traversal of associations of the same non-exclusive type, the OODBMS 4 proceeds from step 7.14 to step 7.16 and counts a traversal through the previous iteration's association type key to the previous iteration's OID by incrementing the TimesAccessed value of a NonExclusiveIndividualStats object for the previous iteration's OID which has been appended to a NonExclusiveAssocType object for the previous iteration's association which has in turn been appended to a Stats list attribute of the object. The OODBMS 4 proceeds on from step 7.16 to 7.18. Alternatively, when the OODBMS 4 determines in step 7.14 that the current association traversal does not constitute an interruption of a previously ongoing pattern of traversal of associations of the same non-exclusive type, the OODBMS 4 proceeds from step 7.14 to step 7.18. The OODBMS 4 proceeds from step 7.18 to step 7.0.

Figure 8:
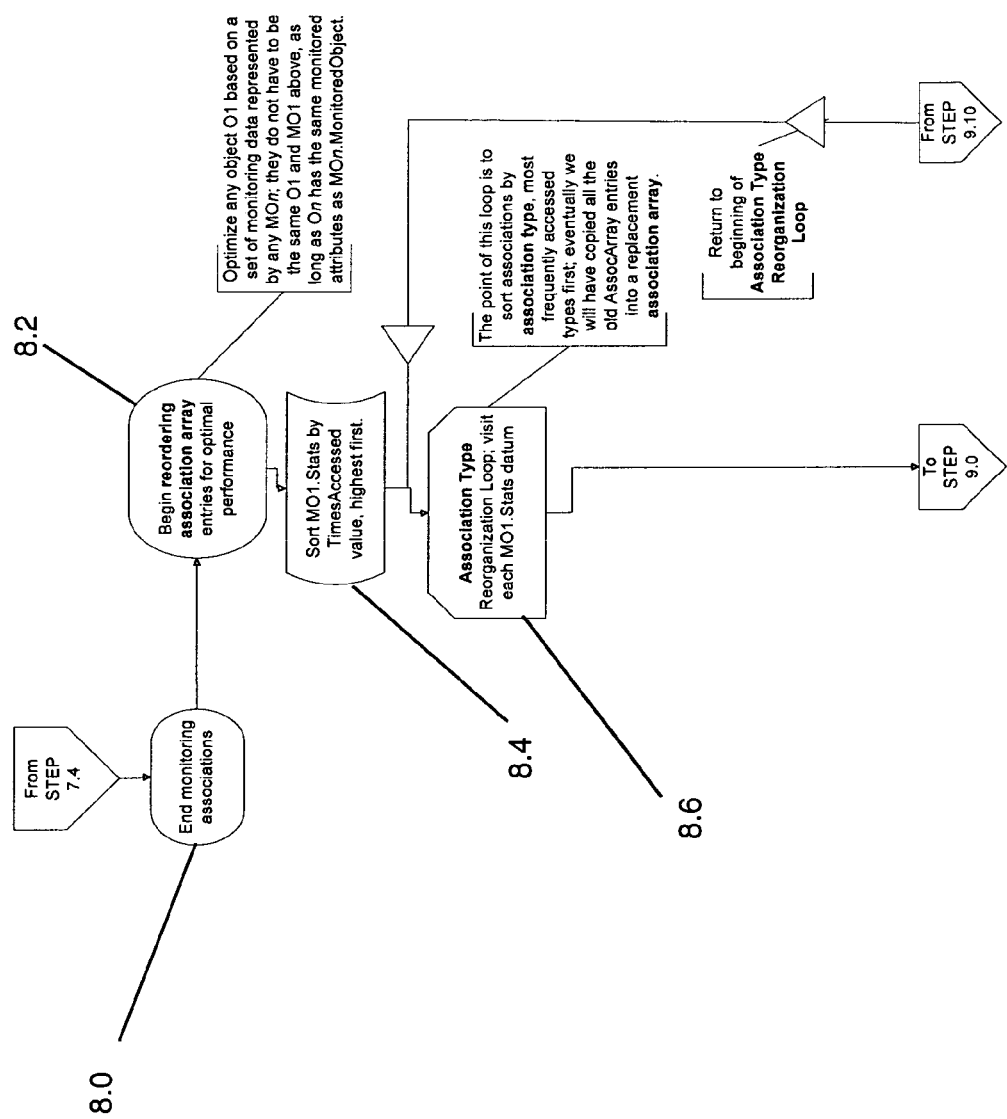
FIG. 8 is a flow chart of still additional aspects of the third method of FIG. 6, wherein a reordering of associations among objects maintained by the OODBMS of FIG. 2 is initiated.

Referring now generally to the Figures and particularly to FIG. 8, FIG. 8 is a flow chart of still additional aspects of the third method of FIG. 6, wherein a reordering of associations among objects M01-M0N & O1-ON maintained by the OODBMS 4 of FIG. 2 is initiated. In step 8.0 the monitoring of associations among persistent objects and a D object M01 maintained by the OODBMS 4 is temporarily halted. In step 8.2 a process loop for reordering of an association array of the D object M01 is initiated with the intent to increase efficiency in the processes of the OODBMS 4 in referencing and investigating associations of the D object M01 and other persistent objects O1-ON & M01-M0N of the OODBMS 4. In step 8.4, the ExclusiveAssocTypeStats and NonExclusiveAssocTypeStats counting structures that have been added to the D object M01 are sorted so that those that have recorded higher numbers of association accesses will be visited earlier in the association reordering process loop starting at step 8.6. The association reordering process loop is employed to order recorded associations between the monitored object O1 by association type, wherein most frequently accessed types are placed for first examination by the OODBMS 4; the recorded associations of the monitored object O1 will be copied into a replacement association array of the monitored object O1.

The OODBMS 4 may optimize any object O1-ON based on a set of monitoring data represented within any object of type DynamicAssocMonitor, provided that the potential set of association types for an object O2-ON is the same as that for the object O1.

In step 8.4 records of object association statistics of the object O1 are sorted to place a higher TimeAccessed values earlier, and in step 8.6 the remaining object associations are ordered in the record of object association statistics for access by the OODBMS 4 in an order from most frequently accessed to least frequently accessed. The OODBMS 4 proceeds from step 8.6 to step 9.0 of FIG. 9.

Figure 9:
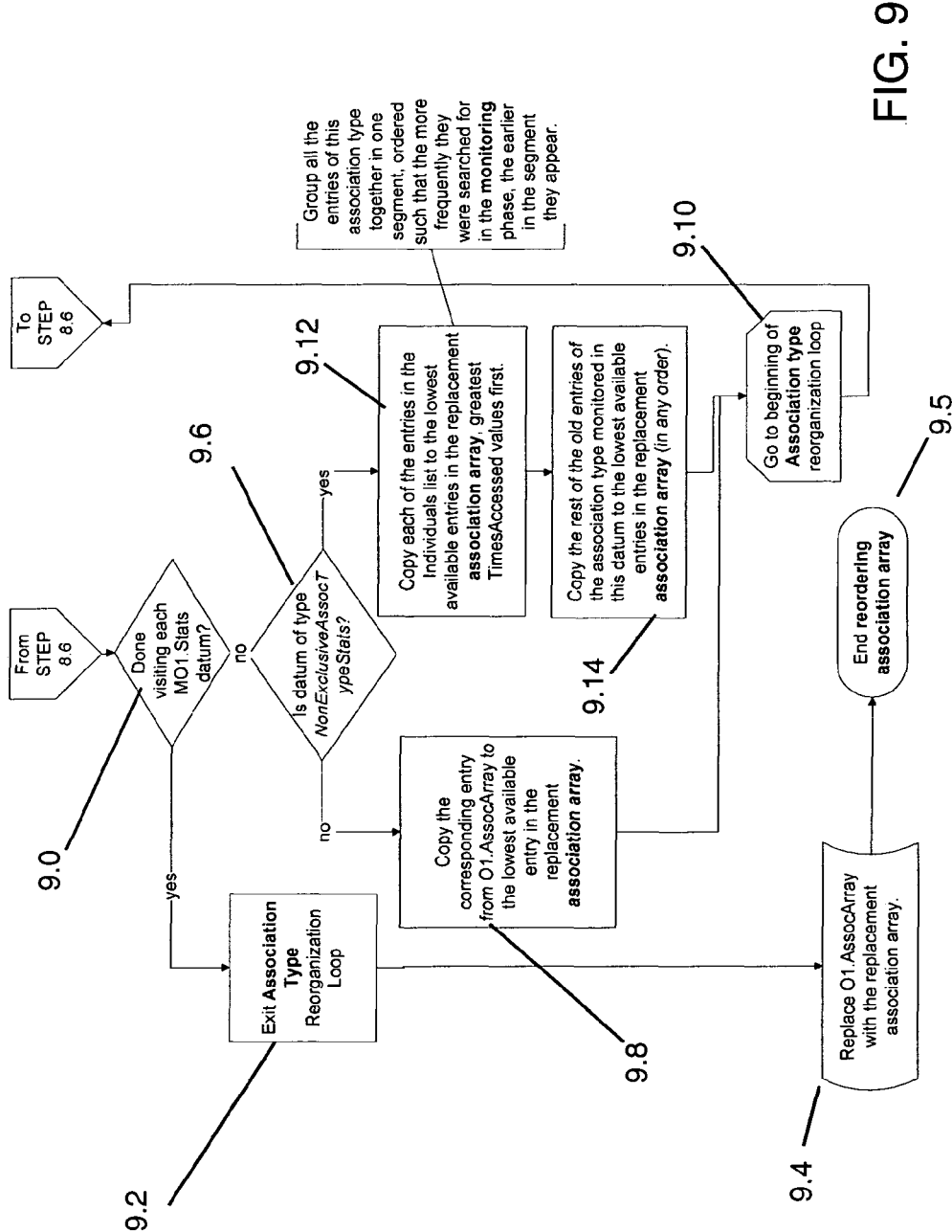
FIG. 9 is a flow chart of yet additional aspects of the third method of FIG. 6, wherein the reordering of associations among objects of FIG. 8 maintained by the OODBMS of FIG. 2 may be completed.

Referring now generally to the Figures and particularly to FIG. 9, FIG. 9 is a flow chart of yet additional aspects of the third method of FIG. 6, wherein the reordering of associations among objects of FIG. 8 maintained by the OODBMS 4 of FIG. 2 may be completed.

In step 9.0, the OODBMS 4 determines whether visitations of the statistics of the object shall cease due to all the statistics having been processed by the computer 2. When the OODBMS 4 determines in step 9.0 to cease visitations of the statistics of the object O1, the OODBMS 4 proceeds from step 9.0 to step 9.2, wherein execution of the association type process loop of steps 8.6 through 9.14 is halted. The OODBMS 4 proceeds from step 9.4 to step 9.5 and commences reordering of the association array of the object O1.

When the OODBMS 4 determines in step 9.0 to continue visitations of the statistics of the object O1, the OODBMS 4 proceeds from step 9.0 to step 9.6, wherein the OODBMS 4 determines in step 9.6 whether an observed datum is of the type of NonExclusiveAssocTypeStats. When the OODBMS 4 determines in step 9.6 that the observed datum is not of the type of NonExclusiveAssocTypeStats, the OODBMS 4 proceeds from step 9.6 to execute step 9.8 to copy an entry of the OBJAssocArray corresponding to the observed datum of step 9.6 to the lowest available entry position in the replacement association array. The OODBMS 4 then proceeds from step 9.8 to step 9.10 and therefrom to step 8.6 to continue the association type reorganization loop by returning to step 8.6 of FIG. 8.

Alternatively, when the OODBMS 4 determines in step 9.6 that the observed datum is of the type of NonExclusiveAssocTypeStats, the OODBMS 4 proceeds from step 9.6 to execute step 9.12 and to copy each of the entries in the individuals list to the lowest available entries in the replacement association array, with the greatest TimesAccessed values are placed for earlier examination by the OODBMS 4. In step 9.12, all the entries of an association type may be grouped together in a same segment of an association array, and ordered such that the more frequently an object is observed by the OODBMS 4 to have been searched for in the monitoring phase, the earlier in the segment of the association array an association referencing the object will appear. The OODBMS 4 proceeds from step 9.12 to step 9.14 to copy the remaining earlier entries of the association type monitored in the observed datum of step 9.6 to the lowest available entry locations in the replacement array of the object O1, optionally in any order. The OODBMS 4 then proceeds from step 9.14 to step 9.10 and therefrom to step 8.6 to continue the association type reorganization loop by returning to step 8.6 of FIG. 8.

Figure 10:
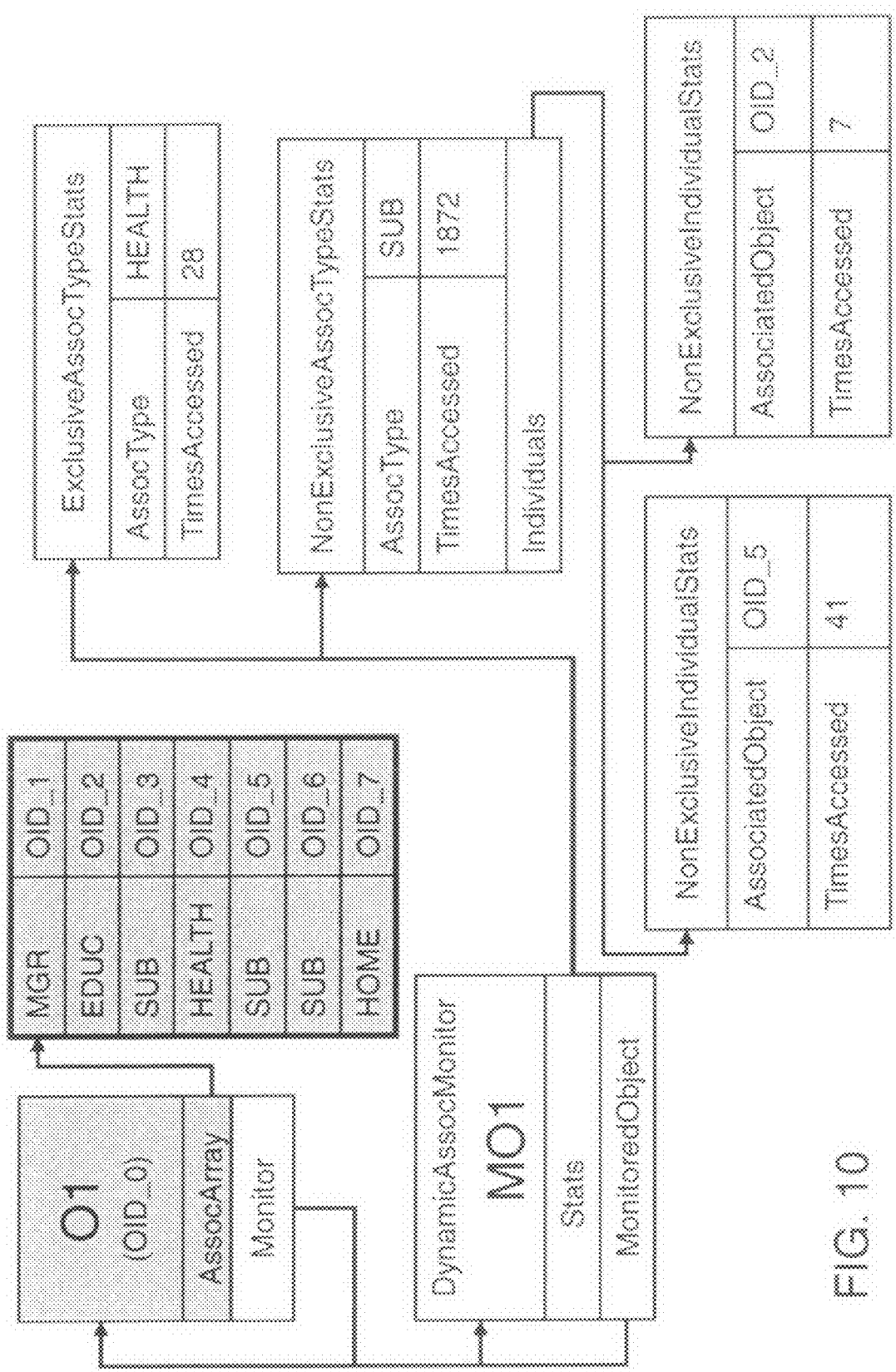
FIG. 10 is a schematic of the object of the third method of FIGS. 6 through 9.

FIG. 10 is a schematic of the object O1 the D object M01 of the third method of FIGS. 6 through 9. The object O1 includes an object identifier OID, an association array A1 and a monitor OM. The monitor OM associates the object O1 to the D object M01 by a pointer, or alternatively the monitor OM comprises D object M01. The D object M01 is a dynamic association monitoring instrument and maintains statistical information S1 and a MonitoredObject pointer P1 to the monitored object O1. The statistical information S1 includes one or more ExclusiveTypeStats arrays E and one or more NonExclusiveIndividualStats arrays N1-N3. Each ExclusiveTypeStats array E records instances of traversals by the OODBMS from the parent object O1 to another object O2-ON wherein the selected object O2-ON has an exclusive type of relationship as noted in the association array A1. An exclusive type of relationship is defined to indicate that the other object O2-ON has an association type AssocType, e.g., HEALTH, that is uniquely assigned within the association array A1 of the parent object O1 that is not assigned elsewhere to any other object O2-ON within the association array A1 of the parent object O1.

Each NonExclusiveIndividualStats array N1-N3 records instances of traversals by the OODBMS from the parent object O1 to a specific other object O2-ON wherein the selected object O2-ON has a nonexclusive type of relationship as noted in the association array A1. A nonexclusive type of relationship is defined to indicate that the selected object O2-ON has an association type AssocType, e.g., subordinate SUB, that is assigned two or a plurality of times within the association array A1 of the parent object O1.

In object databases, a given association type can have the property of associating an object O1 with either (a.) another unique object O2-ON in an exclusive association, e.g. a father-child association, since a person has but father; or (b.) with any number of other objects, i.e. in a non-exclusive association, e.g. a sister-sibling association, since a person can have any number of siblings. Where an object's associations are stored heterogeneously in a single array, where entries have association type keys that map to object identifier values, an exclusive association entry will have unique keys, and the non-exclusive association entries may not have unique keys. To work for an object association implementation, the third method may optionally accommodate unique and non-unique keys in a real-life visitation pattern.

The third method may be configured or applied to identify non-exclusive associations and apply customized counting principles. When a software program or process of the OODBMS 4 traverses non-exclusive associations, an iteration visits some or all of an object's O1 associations of that type—for example, *visiting* each *sister* of a person—and here each visit does not entail restarting a key lookup from entry 0, but rather just continuing on until the next key of a certain association type is found. Such an iteration may either visit all of those associations or stop after a particular one. In the latter case, the OODBMS 4 interprets that the last visited entry was searched for, and normalizes to compensate for overly simplistic interpretations such as that the first entry of a certain association type is particularly valuable to move earlier in the order merely because the entry was visited by the OODBMS 4 in every traversal of that type, even though it might never have been the one actually searched for by the OODBMS 4.

The third method may optionally be applied to work when monitoring data is collected as transient data within a single database client process. The next level of accommodation could be to allow data to be collected over any number of sequential client processes, which may require that the monitoring data be stored persistently in the OODBMS 4, and that the data be locked against concurrent access by multiple clients.

To accommodate multiple concurrent clients of the computer 2 contributing monitoring data, the OODBMS 4 may add some data to verify that sequential visitations in fact originate from the same client transaction.

Another optional feature of the third method enables a programmer to (a.) manually by command start and stop execution of one or more software programs or processes of the computer 2; and/or (b.) direct the computer 2 to monitor software objects O1-OX for a set number of visitations, at the completion of which monitoring a reordering of association array entries is automatically effected.

Another optional feature of the third method provides a modular class implementation of the DynamicAssocAccessMonitor that can be applied to the same object O1 as that for which data was gathered, or any number of objects of a same object class (i.e., with the same set of associations defined for them). Optionally and additionally or alternatively, cumulative monitoring data may be kept and used for periodic re-optimization.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the Present Invention as disclosed and claimed should, therefore, be determined with reference to the knowledge of one skilled in the art and in light of the disclosures presented above.

What is claimed is:

1. In an information technology system having an OODBMS, a method for managing dynamic object associations of a parent software object as an array of object references, the method comprising:
    a. generating a key pair listing, each listing containing at least one key pair, each key pair including an object relationship identifier and an OID;
    b. associating the key pair listing with the parent software object;
    c. maintaining a history of OODBMS interaction with the key pair listing; and
    d. organizing the access order of the key pairs to cause the key pairs more frequently satisfying OODBMS queries to be examined earlier in the execution of a query than key pairs that have less frequently satisfied OODBMS queries.

2. The method of claim 1, wherein the key pair listing is stored within the parent object.

3. The method of claim 1, wherein the history of OODBMS interaction with the key pair listing is stored within the parent object.

4. The method of claim 3, wherein the key pair listing is stored within the parent object.

5. The method of claim 1, wherein the at least one OID comprises a pointer to a software object.

6. The method of claim 1, wherein the at least one OID comprises a pointer to an attribute of a software object.

7. The method of claim 1, wherein at least one OID comprises a reference to an address of a heterogeneous object type.

8. The method of claim 1, wherein at least one OID comprises a memory address of a software structure.

9. The method of claim 1, wherein at least one OID comprises a pointer to a software structure.

10. The method of claim 1, wherein the listing is a variable length array.

11. A computer-readable media comprising machine-readable instructions that direct a computational system to execute the steps of the method of claim 1.

12. An information technology system configured for managing an object oriented data base, the system comprising:
 a. a data base management system having an object oriented software data base;
 b. means to generate a software array;
 c. means to associate the software array with an individual software object of the object oriented data base;
 d. means to store a history of traversal records in the array, wherein each traversal record identifies at least one other software structure; and
 e. means to organize the order of the traversal records to cause more frequently accessed traversals to be examined earlier than less frequently accessed traversals.

13. The system of claim 12, wherein at least one traversal record identifies a software object.

14. The system of claim 12, wherein at least one traversal record comprises a pointer to a software object.

15. The system of claim 12, wherein at least one traversal record comprises a pointer to an attribute of a software object.

16. The system of claim 12, wherein at least one traversal record comprises a binding between the software object and a heterogeneous object type.

17. The system of claim 12, wherein at least one traversal record includes a memory address of a software structure.

18. The system of claim 12, wherein the array is a variable length array.

19. The system of claim 12, wherein the order of the traversal records is further organized to cause more frequently accessed traversals previously resulting in satisfying previous queries to be examined earlier than less frequently accessed traversals.

20. The system of claim 12, wherein the order of the traversal records is further organized to cause more frequently accessed traversals previously failing to satisfy queries to be examined after less frequently accessed traversals.

\* \* \* \* \*